United States Patent
Grunder et al.

(10) Patent No.: US 10,023,687 B2
(45) Date of Patent: Jul. 17, 2018

(54) EPOXY SYSTEMS EMPLOYING TRIETHYLAMINETETRAAMINE AND TIN CATALYSTS

(71) Applicant: Dow Global Technologies LLC, Midland, MI (US)

(72) Inventors: Sergio Grunder, Zurich (CH); Timothy A. Morley, Schindellegi (CH); Rainer Koeniger, St. Gallenkappel (CH); Nebojsa Jelic, Wangen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/308,940

(22) PCT Filed: Jul. 14, 2015

(86) PCT No.: PCT/US2015/040242
§ 371 (c)(1),
(2) Date: Nov. 4, 2016

(87) PCT Pub. No.: WO2016/010944
PCT Pub. Date: Jan. 21, 2016

(65) Prior Publication Data
US 2017/0114180 A1    Apr. 27, 2017

Related U.S. Application Data

(60) Provisional application No. 62/025,709, filed on Jul. 17, 2014.

(51) Int. Cl.
| | |
|---|---|
| C08G 59/50 | (2006.01) |
| C08G 59/68 | (2006.01) |
| C08G 59/14 | (2006.01) |
| C08G 59/24 | (2006.01) |
| C08G 59/06 | (2006.01) |
| C08J 5/04 | (2006.01) |
| C08K 7/02 | (2006.01) |
| C08L 63/04 | (2006.01) |
| C08L 63/00 | (2006.01) |
| B62D 29/04 | (2006.01) |

(52) U.S. Cl.
CPC ........ *C08G 59/685* (2013.01); *C08G 59/1477* (2013.01); *C08G 59/245* (2013.01); *C08G 59/502* (2013.01); *C08G 59/5073* (2013.01); *C08J 5/04* (2013.01); *C08K 7/02* (2013.01); *C08L 63/00* (2013.01); *B62D 29/04* (2013.01); *C08J 2363/00* (2013.01); *C08J 2363/02* (2013.01); *C08J 2363/04* (2013.01)

(58) Field of Classification Search
CPC ..... C08L 63/00–63/10; C09D 163/00–163/10; C09J 163/00–163/10; C08J 2263/00–2263/10; C08J 5/04; C08G 59/681; C08G 59/50; C08G 59/502; C08G 59/685; C08K 7/02; B62D 29/04
See application file for complete search history.

(56) References Cited

U.S. PATENT DOCUMENTS

| | | | | |
|---|---|---|---|---|
| 2,912,389 | A * | 11/1959 | Phillips | C08G 59/184 528/103 |
| 3,201,360 | A * | 8/1965 | Proops | B01D 46/0021 528/104 |
| 3,264,230 | A * | 8/1966 | Proops | C08G 59/687 525/328.2 |
| 4,992,228 | A | 2/1991 | Heck et al. | |
| 5,080,851 | A | 1/1992 | Flonc et al. | |
| 5,414,067 | A | 5/1995 | Vratsanos et al. | |
| 5,698,318 | A | 12/1997 | Burton et al. | |
| 5,852,133 | A * | 12/1998 | Gupta | C08F 8/30 525/375 |
| 2011/0218270 | A1* | 9/2011 | Suter | C08G 69/34 523/400 |
| 2015/0152259 | A1* | 6/2015 | Sakane | C08J 5/24 523/427 |

FOREIGN PATENT DOCUMENTS

| | | |
|---|---|---|
| CN | 102250321 A | 11/2001 |
| WO | 2008140906 A1 | 11/2008 |
| WO | WO-2013070393 A1 * | 5/2013 ............. C08G 59/24 |
| WO | WO-2014078218 A1 * | 5/2014 ........... C08G 59/245 |
| WO | 2015119881 A1 | 8/2015 |

OTHER PUBLICATIONS

Dow Chemical, DER 331 Technical Data Sheet (no date).*
Jie Wu, Hong-Guang Xia, Green Chemistry 2005, 7, 708-710.

* cited by examiner

*Primary Examiner* — Kregg T Brooks

(57) ABSTRACT

The invention relates to curable epoxy resin systems comprising polyethylene tetraamine and a tin catalyst as hardening agents, and optionally comprising 1,4-diaza[2.2.2]bicyclo octane. The invention also relates to articles made therefrom, including composites such as carbon fiber reinforced composites. The curable epoxy resins have rapid demold times and/or high glass temperature.

9 Claims, No Drawings

EPOXY SYSTEMS EMPLOYING TRIETHYLAMINETETRAAMINE AND TIN CATALYSTS

FIELD OF THE INVENTION

The invention relates to curable epoxy resin systems comprising polyethylene tetraamine and a tin catalyst as hardening agents. The invention also relates to articles made therefrom, including composites such as carbon fiber reinforced composites.

INTRODUCTION

The global demand for reduced $CO_2$ emissions and fuel-efficient vehicles is a key driver in the development of lighter weight vehicles. The production of such light weight vehicles would enable power trains in the automotive industry to evolve in order to meet increasing current and future regulations by facilitating the possibility to downsize more conventional power trains while delivering advantages to electrically powered vehicles by the reduction in the energy required per kilometer of travel. Thermoset-based composites offer a lightweight alternative to conventional steel and aluminum structures and load-bearing vehicle components. These materials allow high design flexibility in a relatively low cost process though have often been characterized in production by long cycle times which has restricted their widespread acceptance in high volume production in the automotive industry. Composite materials are an attractive alternative to metals due to their high strength to weight ratio as well as their resistance to corrosion. However, in order to adequately compete with metal-based materials any composite-based material should be able to be manufactured in a competitive time frame. In order to achieve this with composite materials produced with an epoxy-based matrix, the epoxy system should possess a curing profile that enables efficient fiber wetting and mold filling prior to gelation followed by an extremely rapid curing profile enabling the said composite part to be rapidly demolded.

Many resin transfer molding (RTM) formulations currently used in industry contain diethylenetriamine (DETA) as a key fast curing amine in the formulation. However, due to the re-classification of DETA to Toxic plus (T+), many key OEMs in the automotive industry will no longer use formulations containing DETA. As a result, fast curing formulations for RTM are required that maintain the correct balance of gel and demolding times without using components labeled toxic.

While some alternatives to DETA are now available, these formulations often have a limitation of glass transition temperature of less than 130° C. and more often in the range of 110 to 120° C. For applications requiring a higher thermal performance during manufacture including painting and E-coat or cathodic dip painting (CDP or KTL) processes, or for final applications where a higher thermal performance may be required, these lower Tg materials would not be suitable due to deformation or damage which may occur. Fast curing higher glass transition systems are available via the use of anhydride chemistries but these have limitations of high cost and environmental health and safety restrictions. Historically, formulators of epoxy systems requiring higher Tg materials have relied upon cycloaliphatic or aromatic amine compounds to boost Tg. The cycloaliphatic amines are considerably more expensive than their linear counterparts, while the aromatic amines are under increased scrutiny due to their often negative health effects. Coupled with this, the addition of both cycloaliphatic and aromatic amines significantly slows the curing reaction, and often these materials need further post-curing steps, all leading to an undesirable increase in cycle time for the automotive industry.

U.S. Patent Application 61/936,899 (filed Feb. 7, 2014) describes curable epoxy resin systems comprising an epoxy resin component including two or more epoxy resins, including an epoxy novolac resin; and a hardener component including polyethylene tetraamine and optionally including 1,4-diazabicyclo[2.2.2]octane.

There remains a need for RTM formulations that do not comprise DETA as a hardener, and provide rapid cure time, e.g., rapid de-mold time.

There remains a need for RTM formulations that do not comprise DETA as a hardener, and provide a high glass transition temperature.

SUMMARY OF THE INVENTION

It has been found that these and other benefits are provided by a curable resin system comprising a) an epoxy component comprising a liquid epoxy resin; and b) a hardener component comprising a tin catalyst and 80 to 99.99 wt % of a of a polyethylene tetraamine mixture (preferably a triethylenetetraamine mixture), based on weight of the hardener component. Preferably, the tin catalyst comprises dimethyltin dineodecanoate, in an amount of 0.01 to 3.0 wt % based on weight of the hardener component. Preferably, the hardener component further comprises 1,4-diazabicyclo[2.2.2]octane, in an amount up to 15 wt %, based on weight of the hardener component.

DETAILED DESCRIPTION OF THE INVENTION

The hardener component comprises a majority of polyethylene tetraamine, and a minority of a tin catalyst. Optionally, the hardener component may further comprise a minority of 1,4-diazabicyclo[2.2.2]octane (DABCO).

The hardener component of the present resin system comprises polyethylene tetraamine or polyethylene tetraamine mixture. By "polyethylene tetraamine mixture," it is meant a mixture of polyethylene polyamine compounds, of which at least 95% by weight, based on the total weight of the mixture, have exactly four amine nitrogen atoms. For purposes of this invention, those polyethylene polyamine compounds having exactly four amine nitrogen atoms are referred to as "polyethylene tetraamine" compounds.

The polyethylene tetraamine compound can be linear, branched and/or cyclic. At least 40% of the weight of the polyethylene tetraamine mixture is linear triethylenetetraamine (TETA), i.e.:

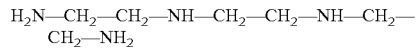

Linear triethylenetetraamine may constitute at least 60%, preferably at least 90%, more preferably at least 95%, and most preferably up to 100%, of the weight of the polyethylene tetraamine mixture, based on the total weight of the hardener component.

The polyethylene tetraamine mixture may include other polyethylene tetraamine compounds such as, for example, N,N'-bis(2aminoethyl)piperazine, (piperazinoethyl)ethylenediamine and tris(aminoethyl)amine. These polyethylene tetraamine compounds are commonly present in significant amounts (up to, for example 55% or up to 35% by weight based on total weight of the hardener component in the aggregate) in commercially available TETA (triethylenetetraamine) products.

The polyethylene tetraamine mixture may include small amounts of other aliphatic or cycloaliphatic amine compounds having three or fewer amine nitrogen atoms or five or more amine nitrogen atoms. These compounds preferably constitute at most 5% by weight, preferably at most 2% by weight and more preferably at most 1% by weight of the polyethylene tetraamine mixture. The polyethylene tetraamine mixture preferably contains no more than 0.3% by weight of aminoethylethanol amine.

The polyethylene tetraamine, preferably TETA, can be present in any effective amount to obtain one or more benefits of the present invention. The polyethylene tetraamine preferably comprises 80 wt %, 85 wt %, 90 wt %, 91 wt %, 92 wt %, 92.2 wt %, 93 wt %, 98 wt %, 98.5 wt %, 99 wt %, 99.2 wt %, 99.25 wt %, 99.4 wt %, 99.6 wt %, 99.8 wt %, 99.9 wt %, or 99.99 wt %, based on weight of the hardener composition. Ranges formed from pairs of preferred percentages are also included in the invention.

The hardener component of the present invention comprises a tin catalyst comprising one or more tin II and/or tin IV compounds. Tin IV compounds are preferred. Examples of tin catalysts include dimethyltin dineodecanoate; dibutyltin diisooctylmaleate; di-n-butylbis(2,4 pentanedionate) tin; di-n-butylbutoxychlorotin; dibutyltin dilaurate; dioctyltin dilaurate; dimethylhydroxy(oleate)tin; tin II octoate; tin II neodecanoate; tin II oleate; and combinations of one or more thereof. The tin catalyst preferably comprises, more preferably consists essentially of, and more preferably consists of, dimethyltin dineodecanoate, dibutyltin dilaurate, dioctyltin dilaurate, or combinations thereof.

The tin catalyst, preferably dimethyltin dineodecanoate, can be present in any effective amount to obtain one or more benefits of the present invention. Some preferred amounts of tin catalyst include 0.01 wt %, 0.1 wt %, 0.2 wt %, 0.4 wt %, 0.6 wt %, 0.7 wt %, 0.75 wt %, 0.8 wt %, 1.0 wt %, 1.2 wt %, 1.5 wt %, and 3.0 wt %, based on weight of the hardener composition. Ranges formed from pairs of preferred percentages are also included in the invention.

The hardener component of the present invention optionally comprises 1,4-diazabicyclo[2.2.2]octane. This compound is also known as triethylenediamine (TEDA) or DABCO. DABCO is a tertiary amine that is highly efficient at hardening the epoxy resin system of the present invention. Without being limited by theory, it is believed that the efficiency of DABCO in the present invention may be attributable to the strained nature of the tertiary amine groups in the molecule. DABCO is commercially available as a solid or as a liquid (e.g., in a polyol solvent). Solid DABCO is preferred for the present invention, though care must be taken during handling because of its low flash point.

DABCO, when used, can be present in any effective amount to obtain one or more benefits of the present invention. Some preferred amounts of DABCO include 0 wt %, 1 wt %, 3 wt %, 4 wt %, 6 wt %, 7 wt %, 7.1 wt %, 7.6 wt %, 8 wt %, 10 wt %, 12 wt %, and 15 wt %, based on weight of the hardener composition. Ranges formed from pairs of preferred percentages are also included in the invention.

Any proportion of polyethylene tetraamine to tin catalyst may be used in the present invention, and can be determined by one of ordinary skill in the art. Some preferred weight ratios of polyethylene tetraamine (e.g., TETA) to tin catalyst (e.g., dimethyltin dineodecanoate) include 75:1, 100:1, 120: 1, 125:1, 130:1, 132:1, 135:1, 140:1, 150:1, 175:1, and 200:1. Ranges formed from pairs of preferred ratios are also included in the invention.

When the hardener composition comprises DABCO, any proportion of polyethylene tetraamine to DABCO may be used in the present invention, and can be determined by one of ordinary skill in the art. Preferred weight ratios of polyethylene tetraamine (e.g., TETA) to DABCO include 6:1, 9:1 (15 mol %), 11:1, 12:1, 13:1 (10 mol %), 14:1, 15:1, 17:1, 20:1, 26:1 (5 mol %), and 100:1. Ranges formed from pairs of preferred ratios are also included in the invention.

When the hardener composition comprises DABCO, any proportion of DABCO to tin catalyst may be used in the present invention, and can be determined by one of ordinary skill in the art. Preferred weight ratios of DABCO to tin catalyst (e.g., dimethyltin dineodecanoate) include 1:1, 4:1, 6:1, 8:1, 9:1, 10:1, 11:1, 12:1, 14:1, and 16:1. Ranges formed from pairs of preferred ratios are also included in the invention.

The hardener component preferably comprises only polyethylene tetraamine and tin catalyst; or polyethylene tetraamine, tin catalyst, and DABCO. If other hardeners are present, they preferably constitute no more than 10%, more preferably no more than 5% and still more preferably no more than 3% or 1% by weight of the hardener component. Among the other hardeners that can be used are, for example, dicyandiamide, phenylene diamine (particularly the meta-isomer), bis(4-amino-3,5-dimethylphenyl)-1,4-diisopropyl-benzene,bis(4-amino-phenyl) 1,4-diiospropylbenzene, diethyl toluene diamine, methylene dianiline, mixtures of methylene dianiline and polymethylene polyaniline compounds (sometimes referred to as PMDA, including commercially available products such as DL-50 from Air Products and Chemicals), diaminodiphenylsulfone, and phenolic hardeners such as bisphenol A, K, F, S, and AD.

The epoxy component for use in the present invention can comprise any epoxy resin that can be cured by the hardener component of the present invention. The epoxy component preferably comprises one or more epoxy resins having an average of two or more epoxide groups that are curable by reaction with a primary, secondary, and/or tertiary amine per molecule. For ease of handling, liquid epoxy resins are preferred, though solid epoxy resins may also be included. When a solid epoxy resin is used, it preferably dissolves in the curable resin system, e.g., at room temperature or at a temperature less than or equal to the curing temperature. Preferred epoxy resins include diglycidyl ethers of bisphenols, e.g., diglycidyl ethers of bisphenol A (DGEBA). Optionally, the resin component includes an epoxy novolac resin.

The polyglycidyl ether of a polyphenol resin useful in the present invention preferably has a lower mono hydrolyzed resin content. The resin may contain, for example and based on the total weight of the polyglycidyl ether of a polyphenol resin, no more than 3 wt %, preferably no more than 2 wt % and still more preferably no more than 1 wt % of mono hydrolyzed resin content. Mono hydrolyzed resins are α-glycol compounds formed by the addition of a molecule of water to an epoxide group. The presence of significant quantities of mono hydrolyzed content tends to increase the viscosity of the epoxy component, and in turn that of the epoxy resin/hardener mixture. In addition, it is believed that these species may contribute to a reduction in open time. The polyglycidyl ether of a polyphenol resin preferably has an epoxy equivalent weight of up to about 250.

The epoxy component contains at least 10% by weight of one epoxy resin which is one or more polyglycidyl ethers of a polyphenol having an epoxy equivalent weight of up to about 250, preferably a DGEBA epoxy resin. The epoxy component preferably contains 20 wt %, 30 wt %, 40 wt %, 50 wt %, 60 wt %, 80 wt %, or 100 wt %, based on the total weight of the epoxy component. Ranges formed from pairs of preferred ratios are also included in the invention.

In a preferred embodiment, the epoxy component optionally comprises one or more epoxy novolac resins. Epoxy novolac resins useful in the present invention can be generally described as methylene-bridged polyphenol compounds, in which some or all of the phenol groups are capped with an epoxy containing group, typically by reaction of the phenol groups with epichlorohydrin to produce the corresponding glycidyl ether. The phenol rings may be unsubstituted, or may contain one or more substituent groups, which, if present are preferably alkyl having up to six carbon atoms and more preferably methyl. The epoxy novolac resin may have an epoxy equivalent weight of about 156 to 300, preferably about 170 to 225 and especially from 170 to 190. The epoxy novolac resin may contain, for example, from 2 to 10, preferably 3 to 6, more preferably 3 to 5 epoxide groups per molecule. Among the suitable epoxy novolac resins are those having the general structure:

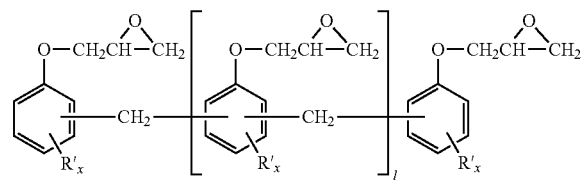

in which 1 is an integer from 0 to 8, preferably 1 to 4, more preferably 1 to 3, each R' is independently alkyl or inertly substituted alkyl, and each x is an integer from 0 to 4, preferably 0 to 2 and more preferably 0 to 1. R' is preferably methyl if present. In the resin system of the present invention, an epoxy novolac resin preferably comprises, 0 wt %, 20 wt %, 30 wt %, 40 wt %, 50 wt %, 60 wt %, 80 wt %, based on the total weight of the epoxy component. Ranges formed from pairs of preferred ratios are also included in the invention.

Epoxy novolac resins typically have very high viscosity, which can make them difficult to work with, e.g., when preparing epoxy resin compositions, and/or when processing for molding, e.g., by RTM. Therefore, it is advantageous to combine the epoxy novolac resin with a lower-viscosity resin, such as a polyglycidyl ether of a polyphenol, e.g., a DGEBA resin.

The epoxy component and the hardener component may be combined in any suitable proportion to obtain, upon curing, a suitably cured product. Suitable proportions can be determined by one of ordinary skill in the art, and may vary across different curable resin systems. As a general guide, based on 100 parts by weight of epoxy component, the amount of hardener used can preferably include, for example, 10, 12, 14, 15, 16, 18, or 20 parts by weight. Some preferred amounts of hardener include 15.1, 15.2, 16.2 and 16.3 parts by weight. Ranges formed from pairs of preferred proportions are also included in the invention.

In a preferred embodiment, the hardener component and epoxy component are combined in any suitable amount, although an excess of amine equivalents relative to epoxy equivalents is preferred. Preferably, at least 0.8 epoxy equivalents are provided to the reaction mixture of the two components per amine hydrogen equivalent. Preferred amounts include at least 0.9 or 1.0 epoxy equivalents per amine hydrogen equivalent. The epoxy component can be provided in large excess, such as up to 10 epoxy equivalents per amine hydrogen equivalent provided to the reaction mixture, but preferably there are no more than 2, more preferably no more than 1.25 and still more preferably no more than 1.10 epoxy equivalents provided per amine hydrogen equivalent. Embodiments in which the hardener is present in a small excess (for example from 0.0 or 0.1 to 0.80 epoxy equivalents per equivalent of amine hydrogens) often exhibit particularly short demold times while producing a cured resin having a high glass transition temperature.

The curable resin systems of the present invention provide cured articles comprising thermoset resins. Thus, the curable resin systems can be used to manufacture articles including composites, preferably fiber-reinforced composites, preferably carbon fiber reinforced composites. Any method may be used to manufacture such articles. The present invention includes cured inventive curable resin system, as well as articles made therefrom, and methods of manufacturing such articles.

A preferred method for manufacturing articles from the inventive curable resin system includes resin transfer molding (RTM). In the RTM method, the epoxy resin and hardener (and possible other ingredients, such as an internal mold release agent) are mixed in a mixing head, then injected into a mold that may comprise reinforcing fibers, such as one or more carbon fiber sheet. The viscosity (which is affected by temperature) should be low enough to ensure that the mold is completely filled, and that reinforcing fibers, if present, are completely wetted by the uncured resin. The mold is generally preheated, so the gelation time of the resin at the mold temperature should be sufficiently long to permit mold-filling and fiber-wetting to take place before the resin system gels. However, once the resin system gels, a rapid demold time is preferred to increase productivity, e.g., so that the article can be more quickly removed from the mold in preparation for the next article to be made.

Thermoset resins are formed from the resin system of the invention by mixing the epoxy component and hardener component, and optionally one or more fillers, and curing the resulting mixture. Either or both of the components can be preheated if desired before they are mixed with each other. It is generally necessary to heat the mixture to an elevated temperature to obtain a rapid cure. In a molding process such as the process for making molded composites, the curable reaction mixture is introduced into a mold, which may be, together with any reinforcing fibers and/or inserts as may be contained in the mold, preheated. The curing temperature may be, for example, from 60 to 180° C. When a long (at least 10 seconds, preferably at least 20 seconds) gel time is desirable, the curing temperature preferably is not greater than 160° C. When both a long gel time and a short demold time is wanted, a suitable curing temperature is 80 to 160° C., preferably 100 to 150° C. and especially 110 to 140° C.

The glass transition temperature, Tg, can be measured by any method. A preferred method uses differential scanning calorimetry. The glass transition temperature (i.e., Tg midpoint) at the time of demolding is preferably at least 120° C., more preferably at least 130° C., still more preferably at least 140° C. and even more preferably at least 150° C. It is preferred to continue the cure until the resulting resin system attains a glass transition temperature in excess of the cure temperature.

An advantage of this invention is that such glass transition temperatures can be obtained with short curing times. This allows for short cycle times, and higher production rates. Demold times at cure temperatures of 100° to 150° C., preferably 110° to 140° C., are preferably at least 15%, 17%, 20%, 35%, or 50% shorter compared to demold times of a comparative resin system that is identical to the curable resin system but comprises no tin catalyst and/or DABCO. Demold times at cure temperatures of 50 to 150° C., preferably 110 to 140° C., are preferably 300 seconds or less, 250 seconds or less, 100 seconds or less, 80 seconds or less, 60 seconds or less, or 50 seconds or less.

The curable resin can include fillers. As used herein, the term "filler" refers to any component of a curable resin system other than an epoxy resin and a hardener. Among these are solvents or reactive diluents such as are described in WO 2008/140906, electroconductive agents, pigments, antioxidants, preservatives, impact modifiers, internal wetting agents and the like. If used, the filler or fillers are not considered part of the epoxy component or the hardener component, although fillers may be mixed with either or both components, or may be separately added, e.g., in an RTM mixing head.

An electro-conductive filler may be used, e.g., to increase the electroconductivity of the article. In some applications, notably automotive applications, it is preferred that the composite is sufficiently electroconductive that coatings can be applied to the composite using so-called "e-coat" methods, in which an electrical charge is applied to the composite and the coating becomes electrostatically attracted to the composite. Conductive fillers of this type include metal particles (such as aluminum and copper), carbon black, carbon nanotubes, graphite and the like.

The inventive curable resin systems may optionally include one or more internal release agents. Depending on the application, an external release agent may be used instead of, or in addition to, an internal release agent. Depending on the application and equipment used, a release agent may be done away with altogether.

When used, an internal mold release agent may constitute up to 5%, more preferably up to about 1% of the total weight of the curable resin system. Suitable internal mold release agents are well known and commercially available, including those marketed as Marbalease™ by Rexco-USA, Mold-Wiz™ by Axel Plastics Research Laboratories, Inc., Chem-lease™ by Chem-Trend, PAT™ by Würtz GmbH, Waterworks Aerospace Release by Zyvax and Kantstik™ by Specialty Products Co. In addition to (or instead of) adding the internal mold release agent during mixing, it is also possible to combine such an internal mold release agent into the epoxy component and/or the hardener component before the epoxy component and the hardener component are brought together.

Toughening agents may also be used in the inventive curable resin system. When used, toughening agents preferably comprise up to 5 or 10 wt %, based in the weight of the curable resin system.

When the curable resin system is used to prepare a composite, e.g., to be injected into a mold comprising carbon fiber or other fiber (e.g., woven fabrics, mats or non-woven materials), it is generally preferred to limit the amount and type of particulate fillers, because it is possible for the particulate matter to become entrapped in portions of the fiber material. This could result in uneven filler distribution in the final composite particle and/or poorer flow of resin throughout the mold. Where the fiber does not impede fillers (e.g., larger fibers and/or fewer fibers per inch; or in the form of flowable short fibers), this is less of a concern. Where the particle size of a filler may result in it being entrapped, it is preferred to use a smaller particle size if possible, or alternatively to limit the amount of that filler to no more than about 1 to 2% by weight of the curable resin system.

The curable epoxy resin system of the invention is particularly useful for making fiber-reinforced composites by curing the system in the presence of reinforcing fibers. These composites are in general made by combining the epoxy component, the hardener component, and optional filler(s), to form a mixture or the resin system of the present invention, wetting the fibers with the mixture, and then curing the mixture in the presence of the catalyst and the reinforcing fibers.

The reinforcing fibers are preferably thermally stable and have a high melting temperature, such that the reinforcing fibers do not degrade or melt during the curing process. Suitable fiber materials include, for example, glass, quartz, polyamide resins, boron, carbon, wheat straw, hemp, sisal, cotton, bamboo and gel-spun polyethylene fibers.

The reinforcing fibers can be provided in the form of short (0.5 to 15 cm) fibers, long (greater than 15 cm) fibers or continuous rovings. The fibers can be provided in the form of a mat or other preform if desired; such mats or preforms may in some embodiments be formed by entangling, weaving and/or stitching the fibers, or by binding the fibers together using an adhesive binder. Preforms may approximate the size and shape of the finished composite article (or portion thereof that requires reinforcement). Mats of continuous or shorter fibers can be stacked and pressed together, typically with the aid of a tackifier, to form preforms of various thicknesses, if required.

Suitable tackifiers for preparing preforms (from either continuous or shorter fibers) include heat-softenable polymers such as described, for example, in U.S. Pat. Nos. 4,992,228, 5,080,851 and 5,698,318. The tackifier should be compatible with and/or react with the polymer phase of the composite, so that there is good adhesion between the polymer and reinforcing fibers. A heat-softenable epoxy resin or mixture thereof with a hardener, as described in U.S. Pat. No. 5,698,318, is especially suitable. The tackifier may contain other components, such as one or more catalysts, a thermoplastic polymer, a rubber, or other modifiers.

A sizing or other useful coating may be applied onto the surface of the fibers before they are introduced into the mold. A sizing often promotes adhesion between the cured epoxy resin and the fiber surfaces.

The composite may be formed in a mold. In such a case, the reinforcing fibers may be introduced into the mold before the epoxy/hardener mixture. This is normally the case when a fiber preform is used. The fiber preform is placed into the mold, the mold is closed, and the epoxy resin/hardener mixture is then introduced into the mold, where it penetrates between the fibers in the preform, fills the cavity, and then cures to form a composite product.

Alternatively, the fibers (including a preform) can be deposited into an open mold, and the reaction mixture can be sprayed, poured or injected onto the preform and into the mold. After the mold is filled in this manner, the mold is closed and the resin system cured. An example of a process of this type is gap compression resin transfer molding, in which the mold containing the fibers is kept open with a gap which may be, for examples 10 to 100% or more of the original cavity thickness. The gap permits lower flow resistance, which makes mold filling easier and facilitates penetration of the reaction mixture around and between the fibers.

Short fibers can be introduced into the mold with the resin system. Such short fibers may be, for example, blended with the epoxy component or hardener component (or both) prior to forming the reaction mixture. Alternatively, the short fibers may be added into the reaction mixture at the same time as the epoxy and hardener are mixed, or afterward but prior to introducing the hot reaction mixture into the mold.

Alternatively, short fibers can be sprayed into a mold. In such cases, the reaction mixture can also be sprayed into the mold, at the same time or after the short fibers are sprayed in. When the fibers and reaction mixture are sprayed simultaneously, they can be mixed together prior to spraying. Alternatively, the fibers and reaction mixture can be sprayed into the mold separately but simultaneously. The sprayed materials may be spread and/or leveled using a doctor blade or similar device before closing the mold and performing the cure. In a process of particular interest, long fibers are chopped into short lengths and the chopped fibers are sprayed into the mold, when or immediately before the hot reaction mixture is sprayed in. Mesh materials often function as flow promoters.

A wet compression process can be used, in which the reaction mixture is applied directly to a fiber preform or stack without injection by spraying (as in the PUpreg or Baypreg processes), or by laying it down as "bands" of system, which are being fed through a wider slit die, which could have a width of 1 cm to 50 cm or more. Sufficient material is applied to reach the desired fiber volume content in the final product. The reaction mixture can be applied to the fibers inside an open mold, or outside the mold. The reaction mixture may instead be applied to the center layer of a buildup, by wetting a layer of fibers with the reaction mixture and then putting a second layer of fibers onto the wetted surface, therefore sandwiching the resin layer in between two layers of fibers. The fiber mats can be made out of non crimped fiber buildups, of woven fabric, of random fiber build-ups or preforms. If the reaction mixture is applied to the fibers outside of the mold, it is typically applied at a somewhat low temperature, to prevent premature curing, and to increase the viscosity of the reaction mixture so it does not drip off the fibers before they are transferred into the mold. The wetted preform is then placed into the lower half of a hot mold, the mold is closed and the material cured under compression.

Composites made in accordance with the invention may have fiber contents of at least 10 volume percent, preferably at least 25 volume percent or at least 35 volume percent, up to 80 volume percent, preferably up to 70 volume percent, more preferably up to 60 volume percent.

The mold may contain, in addition to the reinforcing fibers, one or more inserts. Such inserts may function as reinforcements, may function as flow promoters, and in some cases may be present for weight reduction purposes. Examples of such inserts include, for example, wood, plywood, metals, various polymeric materials, or glass, which may be foamed or unfoamed, such as polyethylene, polypropylene, another polyolefin, a polyurethane, polystyrene, a polyamide, a polyimide, a polyester, polyvinylchloride and the like, various types of composite materials, and the like, that do not become distorted or degraded at the temperatures encountered during the molding step.

The reinforcing fibers and core material, if any, may be enclosed in a bag or film such as is commonly used in vacuum assisted processes.

The mold and the preform (and any other inserts, if any) may be heated to the curing temperature or some other useful elevated temperatures prior to contacting them with the reaction mixture. The mold surface may be treated with an external mold release agent, which may be solvent or water-based.

The particular equipment that is used to mix the components of the reaction mixture and transfer the mixture to the mold is not considered to be critical to the invention, provided the reaction mixture can be transferred to the mold before it attains a high viscosity or develops significant amounts of gels. The process of the invention is amenable to RTM, VARTM, RFI, gap compression resin transfer molding and SCRIMP processing methods and equipment (in some cases with equipment modification to provide the requisite heating at the various stages of the process), as well as to other methods such as wet compression.

The mixing apparatus can be of any type that can produce a highly homogeneous mixture of the epoxy component and hardener component (and any optional materials that are also mixed in at this time). Mechanical mixers and stirrers of various types may be used. Two preferred types of mixers are static mixers and impingement mixers.

In some embodiments, the mixing and dispensing apparatus is an impingement mixer. Mixers of this type are commonly used in so-called reaction injection molding processes to form polyurethane and polyurea moldings. The epoxy component and the hardener component (and other materials which are mixed in at this time) are pumped under pressure into a mixing head where they are rapidly mixed together. Operating pressures in high pressure machines may range from 1,000 to 29,000 psi or higher (6.9 to 200 MPa or higher), although some low pressure machines can operate at significantly lower pressures. The resulting mixture is then preferably passed through a static mixing device to provide further additional mixing, and then transferred into the mold cavity. The static mixing device may be designed into the mold. This has the advantage of allowing the static mixing device to be opened easily for cleaning.

In certain specific embodiments, the epoxy component and the hardener component are mixed as just described, by pumping them under pressure into a mixing head. Impingement mixing may be used. The catalyst is introduced with the epoxy resin, the hardener, or as a separate stream. The operating pressure of the incoming epoxy resin and hardener streams may range from a somewhat low value (for example, from about 1 to about 6.9 MPa) or a high value (such as, for example, from 6.9 to 200 MPa). The resulting mixture of epoxy resin, hardener and catalyst is then introduced into the mold at a somewhat low operating pressure, (such as up to 5 MPa or up to about 1.035 MPa). In such embodiments, the mixture of epoxy resin, hardener and catalyst is typically passed through a static mixer before entering the mold. Some or all the pressure drop between the mix-head and the mold injection port often will take place through such a static mixer. An especially preferred apparatus for conducting the process is a reaction injection molding machine, such as is commonly used to processes large polyurethane and polyurea moldings. Such machines are available commercially from Krauss Maffei Corporation and Cannon or Hennecke.

In other embodiments, the reaction mixture is mixed as before, and then sprayed into the mold. Temperatures are maintained in the spray zone such that the temperature of the hot reaction mixture is maintained as described before.

The mold is typically a metal mold, but it may be ceramic or a polymer composite provided the mold is capable of withstanding the pressure and temperature conditions of the molding process. The mold contains one or more inlets, in liquid communication with the mixer(s), through which the reaction mixture is introduced. The mold may contain vents to allow gases to escape as the reaction mixture is injected.

The mold is typically held in a press or other apparatus which allows it to be opened and closed, and which can apply pressure on the mold to keep it closed during the filling and curing operations. The mold or press is provided with means by which heat or cooling can be provided.

In some embodiments of the foregoing process, the molded composite is demolded in no more than 5 minutes, preferably from 1 to 5 minutes, more preferably from 1 to 3 minutes, after the epoxy resin system has been introduced into the mold. In such processes, the introduced resin system flows around and between the reinforcing fibers and fills the mold and then cures in the mold, preferably forming a polymer having a glass transition temperature of at least 120° C. (more preferably at least 130° C. or at least 140° C.) within three minutes, more preferably within two minutes, after the reaction mixture has been introduced into the mold.

The process of the invention is useful to make a wide variety of composite products, including various types of automotive or other transportation parts. Examples of these parts include vertical and horizontal body panels, automobile and truck chassis components, and so-called "body-in-white" structural components.

Body panel applications include fenders, door skins, hoods, roof skins, decklids, tailgates and the like. Body panels often require a so-called "class A" automotive surface which has a high distinctness of image (DOI). For this reason, the filler in many body panel applications will include a material such as mica or wollastonite.

Parts made in accordance with this invention may be in some cases subjected to high temperatures. For example, certain protective coatings as are commonly used in automotive manufacturing processes often are applied electrostatically in a so-called "ecoat" process, and then subjected to a bake cure. In such a bake cure, the composite may be subjected to a temperature of 140 to 220° C., for a period of 10 to 60 minutes. Resin system and composites made in accordance with this invention which are to be coated in such a manner should have a high enough glass transition temperature as to be able to withstand the high temperature of the bake temperature. In addition, an electroconductive filler may be incorporated into the composite to increase the electrical conductivity of the part, to facilitate the electrodeposition process.

Any percentages or ratios expressed on a weight basis can be converted when appropriate to percentages or ratios expressed on a molar or equivalents basis.

EXAMPLES

The Examples use the following list of materials:

Resin A: a liquid diglycidyl ether of bisphenol A; having an epoxy equivalent weight of about 180 g/eq; and less than 1% by weight of monohydrolyzed resin; a viscosity at 25° C. of 7,000 to 10,000 mPa·s; commercially available from The Dow Chemical Company as VORAFORCE™ TW 100.

Resin B: a liquid diglycidyl ether of bisphenol A; having an epoxy equivalent weight of 176 to 181 g/eq; and less than 1% by weight of monohydrolyzed resin; and a viscosity at 25° C. of 4,000 to 6,000 mPa·s; commercially available from The Dow Chemical Company as VORATRON™ ER 104.

Resin C: an epoxy novolac resin; having an epoxy equivalent weight of 176 to 181 g/eq; commercially available from The Dow Chemical Company as D.E.N. 438.

Hardener A used in Examples 2 and 3 is in each case a blend of a triethylene tetraamine mixture sold as D.E.H. 24 by The Dow Chemical Company and triethylene diamine at a mole ratio of 1:0.1. D.E.H. 24 preferably has an aminoethylethanolamine (AEEA) level<0.3%.).

TETA-E: triethylenetetramine, having a hydrogen amine equivalent weight (AHEW) of 24.4 g/eq. TETA preferably has an aminoethylethanolamine (AEEA) level<0.3%.

TEDA: triethylene diamine; 1,4-diazabicyclo[2.2.2]octane.

DMDN: dimethyltin dineodecanoate, which can be commercially obtained as FOMREZ UL-28 (Momentive).

Example 1

Two curable resin systems are prepared as shown in Table 1a in the indicated weight ratios:

TABLE 1a

| | Hardener | | | Mix ratio |
| --- | --- | --- | --- | --- |
| | TETA-E | Fomrez UL-28 | Epoxy Resin Resin A | (Epoxy: Hardener) |
| Comparative Example 1 | 100 w % | — | 100 w % | 100:15.1 |
| Inventive Example 1 | 99.25 w % | 0.75 w % | 100 w % | 100:15.2 |

Differential Scanning Calorimetry (DSC):

Dynamic DSC is used to determine the entitlement Tg of the formulations. In a heating ramp of 20° C./min the samples are heated from 25 to 200° C., kept isothermal at 200° C. for one minute, cooled in a ramp of 20° C. to 25° C., kept isothermal at 25° C. for one minute, then heated again with a heating ramp of 20° C./min to 200° C. Tg onset and Tg midpoint are determined from the second heating segment.

Chemorheology Experiments:

All rheological measurements are performed with an MCR302 rheometer from Anton Paar equipped with a Peltier heating system, which enables fast temperature control. The instrument is preheated to the test temperature prior to each measurement. A hood covers the plates during the measurements to limit heat loss to the environment. Gelation time (GT) and demold time (DMT) are determined by rheology experiments as follows:

A sample of the mixture is in each case poured into a preheated MCR 301 or 302 rheometer (Anton Paar) (25 mm parallel plates) equipped with a Peltier heating system. The measuring temperature is as indicated in the Tables below. The shear storage and shear loss moduli (G' and G") are continuously measured. The time at which the plots of G' and G" intersect (i.e., when G' becomes equal to G") is taken as the gel time. The time at which G" exhibits its peak value is taken as the vitrification point. The vitrification point corresponds well to a demold time. Results are as indicated in the Tables below.

Results:

Results are shown in Table 1b. The differential scanning calorimetry (DSC) experiments show that the Tg onset of the inventive examples is 11° C. higher than the Tg onset of comparative example 1. The Tg midpoint of the inventive example is 4° C. higher than the Tg midpoint of the comparative example 1. The exotherm of the inventive example is 36 J/g lower than the exotherm of the comparative example, yet the exotherm peak position are only apart by 1° C.

The chemorheology experiments reveal the accelerated reactivity of inventive example 1 relative to the comparative example 1. It takes the comparative example 1 64 s to reach 1 Pa·s. However, the inventive example 1 reaches 1 Pa·s after 50 s. The GT of the inventive example is 23 seconds shorter, and the DMT is 64 seconds shorter, than the GT and DMT of the comparative example—when determined by chemorheology at 120° C.

TABLE 1b

| | DSC | | | Chemorheology (at 120° C.) | |
|---|---|---|---|---|---|
| | Tg onset (° C.) | Tg midpoint (° C.) | Exotherm (J/g) | Exotherm peak (° C.) | GT | DMT | time to reach 1 Pa · s |

| | Tg onset (° C.) | Tg midpoint (° C.) | Exotherm (J/g) | Exotherm peak (° C.) | GT | DMT | time to reach 1 Pa · s |
|---|---|---|---|---|---|---|---|
| Comparative Example 1 | 118 | 133 | 472 | 117 | 106 s | 315 s | 64 s |
| Inventive Example 1 | 129 | 137 | 508 | 118 | 83 s | 251 s | 50 s |

Example 2

Two curable resin systems are prepared as shown in Table 2a in the indicated weight ratios:

TABLE 2a

| | Hardener | | Epoxy Resin | | Mix ratio |
|---|---|---|---|---|---|
| | Hardener A | Fomrez UL-28 | Resin B | Resin C | (Epoxy: Hardener) |
| Comparative Example 2 | 100 w % | — | 40 w % | 60 w % | 100:16.2 |
| Inventive Example 2 | 99.3 w % | 0.7 w % | 40 w % | 60 w % | 100:16.3 |

Hot Plate Experiments:

Gel time and demold times, for purposes of this invention are evaluated according to the following curing evaluation test: the epoxy resin and hardener mixture are separately brought to room temperature (22 to 25° C.) and then mixed for 30 seconds. Optional materials can be added to either the epoxy resin or hardener mixture (or both) either before or at the same time that the epoxy resin and hardener are mixed. The resulting mixture is poured onto a hot plate preheated to 120° C. to form a disk of liquid on the surface of the plate. Time is measured from the point at which the mixture contacts the hot plate surface. The hot plate is maintained at 120° C. as the mixture cures. A line is scored through the liquid disk periodically, using a pallet knife or similar blade. The gelation time (GT) is the time after which the liquid material would no longer flow into the scored line. Demold time (DMT) is the time after pouring at which the disk retains its shape and can be removed from the hot plate surface as a solid, using a pallet knife or similar blade.

Results:

Results are shown in Table 2b. The gelation time and demold time of comparative and inventive example are deduced by hot plate experiments at 120° C. The comparative example has a gel time of 35 s and a demold time of 60 s. In inventive example 2, dimethyltin dineodecanoate is used as synergetic catalyst in combination with DABCO. The gelation time is not affected. The demold time (DMT), however, is reduced by ten seconds (about 17%), indicating the even more latent reaction character of inventive example 1.

TABLE 2b

| | Hot Plate Experiment (at 120° C.) | |
|---|---|---|
| | GT (s) | DMT (s) |
| Comparative Example 2 | 35 | 60 |
| Inventive Example 2 | 35 | 50 |

Example 3

Two curable resin systems are prepared as shown in Table 3a in the indicated weight ratios:

TABLE 3a

| | Hardener | | Epoxy | Mix ratio |
|---|---|---|---|---|
| | Hardener A | Fomrez UL-28 | Resin Resin A | (Epoxy: Hardener) |
| Comparative Example 3 | 100 w % | — | 100 w % | 100:16.2 |
| Inventive Example 3 | 99.3 w % | 0.7 w % | 100 w % | 100:16.3 |

Differential scanning calorimetry (DSC) and chemorheology experiments are performed as described in Example 1. Hot plate experiments are performed as described in Example 2.

Results:

Results are shown in Table 3b. The differential scanning calorimetry (DSC) experiments show that the Tg onset of the inventive examples is 6° C. higher than the Tg onset of comparative example 3, while having the same Tg midpoint at 132° C. The exotherm and the exotherm peak position of inventive example 3 is very close to the values of comparative example 3. The chemorheology experiments reveal the accelerated reactivity of inventive example 3 relative to the comparative example 3. It takes comparative example 3 takes 59 s to reach 1 Pa·s. Inventive example 3, however, reaches 1 Pa·s after 43 s. Also the gelation time (GT) and demold time (DMT) of inventive example 3 are 10 seconds faster than the comparative example 1 when determined by chemorheology at 115° C.

The hot plate experiments are a good mimic of the in-mold conditions of the RTM process. The gelation time determined by hot plate experiments at 120° C. is 45 seconds for both systems. However, the demold time of inventive example 3 is half the demold time of the comparative example. This indicates a reduction in cycle time of 50%.

TABLE 3b

|  | DSC | | | | Chemorheology (at 115° C.) | | | Hot plate (at 120° C.) | |
|---|---|---|---|---|---|---|---|---|---|
|  | Tg onset (° C.) | Tg midpoint (° C.) | Exotherm (J/g) | Exotherm peak (° C.) | GT (s) | DMT (s) | time to reach 1 Pa · s | GT (s) | DMT (s) |
| Comparative Example 1 | 121 | 132 | 502 | 115 | 95 | 204 | 59 s | 45 | 120 |
| Inventive Example 1 | 127 | 132 | 519 | 117 | 85 | 195 | 43 s | 45 | 60 |

The invention claimed is:

1. A curable resin system comprising:
   a) an epoxy component comprising a liquid epoxy resin wherein at least 80 weight percent of the liquid epoxy resin is one or more polyglycidyl ethers of a polyphenol having an epoxy equivalent weight of up to 250; and
   b) a hardener component comprising a tin (IV) catalyst comprising dimethyltin dineodecanoate in an amount of 0.01 to 3.0 wt % based on weight of the hardener component and 80 to 99.99 wt % of a polyethylene tetraamine mixture, based on weight of the hardener component.

2. The curable resin system of claim 1, wherein the hardener component further comprises 1,4-diazabicyclo [2.2.2]octane, in an amount up to 15 wt %, based on weight of the hardener component.

3. The curable resin system of claim 1 comprising 10 to 20 parts by weight of the hardener component for every 100 parts by weight of the epoxy component.

4. The curable resin system of claim 1 further comprising a filler component.

5. The curable resin system of claim 1 having a demold time at least 15% shorter than the demold time of a comparative resin system that is identical to the curable resin system but comprises no tin catalyst.

6. The curable resin system of claim 1 having a demold time at least 15% shorter than the demold time of a comparative resin system that is identical to the curable resin system but comprises no tin catalyst or 1,4-diazabicyclo [2.2.2]octane.

7. A cured resin product obtained by curing the curable resin system of claim 1.

8. The cured resin product of claim 7, which is a fiber composite article.

9. The cured resin product of claim 7, which is obtained by resin transfer molding.

* * * * *